(12) United States Patent
Bauer et al.

(10) Patent No.: US 10,742,105 B2
(45) Date of Patent: Aug. 11, 2020

(54) COOLING DEVICE FOR A HIGH POLE-COUNT ROTOR

(71) Applicants: Siemens Aktiengesellschaft, Munich (DE); Voith Patent GmbH, Heidenheim (DE)

(72) Inventors: Anne Bauer, Fuerth (DE); Klaus Dennerlein, Erlangen (DE); Michael Frank, Uttenreuth (DE); Joern Grundmann, Grossenseebach (DE); Peter Kummeth, Herzogenaurach (DE); Peter van Hasselt, Erlangen (DE)

(73) Assignee: VOIT PATENT GMBH, Heidenheim (DE)

( * ) Notice: Subject to any disclaimer, the term of this patent is extended or adjusted under 35 U.S.C. 154(b) by 365 days.

(21) Appl. No.: 15/544,421

(22) PCT Filed: Dec. 14, 2015

(86) PCT No.: PCT/EP2015/079601
§ 371 (c)(1),
(2) Date: Jul. 18, 2017

(87) PCT Pub. No.: WO2016/119968
PCT Pub. Date: Aug. 4, 2016

(65) Prior Publication Data
US 2018/0041105 A1    Feb. 8, 2018

(30) Foreign Application Priority Data
Jan. 30, 2015 (DE) .................. 10 2015 201 610

(51) Int. Cl.
*H02K 9/00* (2006.01)
*H02K 55/04* (2006.01)
(Continued)

(52) U.S. Cl.
CPC .............. *H02K 55/04* (2013.01); *H02K 1/32* (2013.01); *H02K 3/24* (2013.01); *H02K 9/20* (2013.01); *H02K 9/197* (2013.01); *Y02E 40/625* (2013.01)

(58) Field of Classification Search
CPC ..................................................... H02K 55/04
(Continued)

(56) References Cited

U.S. PATENT DOCUMENTS

| 2,894,155 | A |   | 7/1959 | Labastie | .......................... 310/54 |
| 4,204,134 | A | * | 5/1980 | Fritz | ...................... H02K 9/20 |
|   |   |   |   |   | 310/52 |

(Continued)

FOREIGN PATENT DOCUMENTS

| DE | 3229928 A1 | 2/1984 | ............. H02K 55/04 |
| EP | 0040734 A  | 12/1981 | ............. H02K 55/04 |

(Continued)

OTHER PUBLICATIONS

German Office Action, Application No. 102015201610.2, 7 pages, dated Oct. 5, 2015.

(Continued)

*Primary Examiner* — Alexander Talpalatski
(74) *Attorney, Agent, or Firm* — Slayden Grubert Beard PLLC

(57) ABSTRACT

The present disclosure relates to cooling devices. The teachings thereof may be embodied in devices for cooling a rotor, which rotates about an axis, wherein the rotor is supported by a central rotor shaft. For example, in a cooling device, the rotor may be supported by a central rotor shaft and comprise a hollow space in the interior of the rotor shaft for accommodating coolant. It may include a first coolant line extending radially outwardly from the hollow space and an annular (Continued)

first distribution line fluidically connected to the hollow space via the first coolant line.

12 Claims, 4 Drawing Sheets

(51) Int. Cl.
  *H02K 1/32* (2006.01)
  *H02K 3/24* (2006.01)
  *H02K 9/20* (2006.01)
  *H02K 9/197* (2006.01)
(58) Field of Classification Search
  USPC .............................................. 310/54
  See application file for complete search history.

(56) References Cited

U.S. PATENT DOCUMENTS

| | | |
|---|---|---|
| 4,396,847 A | 8/1983 | Weghaupt et al. ............... 31/52 |
| 9,083,206 B2 | 7/2015 | Frank et al. |
| 9,537,374 B2 * | 1/2017 | Frank ..................... H02K 55/04 |
| 9,762,106 B2 * | 9/2017 | Gauthier ................. H02K 9/19 |
| 2013/0187491 A1 * | 7/2013 | Frank ..................... H02K 55/04 |
| | | 310/54 |
| 2013/0225415 A1 * | 8/2013 | Kim ........................ H02K 9/005 |
| | | 505/163 |
| 2013/0270939 A1 * | 10/2013 | Brandl .................... H02K 9/19 |
| | | 310/54 |
| 2016/0164378 A1 * | 6/2016 | Gauthier ................. H02K 1/32 |
| | | 310/54 |

FOREIGN PATENT DOCUMENTS

| | | | | |
|---|---|---|---|---|
| EP | 2521252 A1 | 11/2012 | ............... | F03D 9/00 |
| EP | 2603968 B1 | 4/2017 | ............... | F16C 32/04 |
| WO | 2016/119968 A1 | 8/2016 | ............... | H02K 3/24 |

OTHER PUBLICATIONS

International Search Report and Written Opinion, Application No. PCT/EP2015/079601, 13 pages, dated Mar. 7, 2016.

* cited by examiner

COOLING DEVICE FOR A HIGH POLE-COUNT ROTOR

CROSS-REFERENCE TO RELATED APPLICATIONS

This application is a U.S. National Stage Application of International Application No. PCT/EP2015/079601 filed Dec. 14, 2015, which designates the United States of America, and claims priority to DE Application No. 10 2015 201 610.2 filed Jan. 30, 2015, the contents of which are hereby incorporated by reference in their entirety.

TECHNICAL FIELD

The present disclosure relates to cooling devices. The teachings thereof may be embodied in devices for cooling a rotor, which is mounted so as to be rotatable about a rotational axis, of an electric machine, wherein the rotor is supported by a central rotor shaft.

BACKGROUND

Electric machines may be equipped with cooling devices for cooling rotating electric coil windings. Machines comprising superconductive rotor windings, in particular, are typically equipped with cooling devices in which a coolant such as liquid nitrogen, liquid helium, or liquid neon circulates in the interior of a central rotor shaft according to the thermosiphon principle and can thereby remove heat from the rotor. With the aid of such cooling systems, superconducting coil windings, in particular superconducting rotating excitation windings, can be cooled to an operating temperature below the transition temperature of the superconductor and can be held at this operating temperature.

In the case of such known cooling devices, an end region of the rotor shaft is often used to feed coolant, which has been liquified by a fixed cooling unit, into an inner chamber of the rotor shaft, for example, via a fixed coolant tube which protrudes into the rotor shaft. From the inner chamber of the rotor shaft, the coolant can travel via separate radial lines to the radially further outward positions of the coil windings. Such a cooling device is known, for example, from EP 2 603 968 A1.

These known cooling devices are suitable for cooling electric machines that have only a small number of coil windings. In the case of high pole-count machines having a high number of coil windings, however, the use of a separate radial coolant line for each coil winding would result in a highly complex apparatus.

For this reason, an alternative cooling concept was proposed for high pole-count machines such as those used, for example, in wind-power or hydropower generators. Such an alternative cooling device is described in EP 2 521 252 A1. Therein, the cooling device comprises a plurality of cold heads rotating together with the rotor. The heat to be transported away from the coil windings is carried away via thermal conduction into solid copper elements which are thermally connected to the cold heads. As a result, the feeding of coolant into the rotor shaft and the distribution of the coolant into radially outer positions is completely avoided.

One disadvantage of this cooling concept, however, is that the sensitive and heavy cold heads must be designed for high rotational speeds. One further disadvantage is that, due to the solid copper elements for cooling the coils, a relatively high additional co-rotating mass is present.

SUMMARY

The teachings of the present disclosure include a cooling device for cooling a rotor of an electric machine, which may avoid the aforementioned disadvantages. In particular, a cooling device avoids the arrangement of co-rotating cold heads on the rotor. In addition, the cooling device may have a relatively light weight and the lowest possible number of radial coolant lines. The cooling device is to be suitable, in particular, for use in rotors of high pole-count electric machines.

For example, cooling device for cooling a rotor (1), which is mounted so as to be rotatable about a rotational axis (2), of an electric machine, wherein the rotor (1) is supported by a central rotor shaft (3) and comprises a hollow space (5) in the interior of the rotor shaft (3) for accommodating coolant (6), may include: at least one first coolant line (7a) extending radially outwardly from the hollow space (5) and an annular first distribution line (11a) fluidically connected to the hollow space (5) via the first coolant line (7a).

In some embodiments, the annular first distribution line (11a) is situated, as a closed loop line, concentrically about the rotational axis (2).

In some embodiments, the rotor (1) comprises a plurality of electric coils (12i) at different azimuthal positions and in which each coil (12i) is thermally coupled to a coil cooling pipe (13i) which is fluidically connected to the first annular distribution line (11a) via an outlet (15i).

In some embodiments, the pipe cross-section of the first distribution line (11a) is greater than the pipe cross-section of the individual coil cooling pipes (13i).

In some embodiments, each coil (12i) is connected via a separate coil cooling pipe (13i) to the first annular distribution line (11a).

In some embodiments, the individual coils (12i) are combined to form cooling groups, wherein the coils (12i) of each cooling group are thermally coupled to one shared coil cooling pipe (13i).

In some embodiments, there is at least one second coolant line (7b) extending radially outwardly from the hollow space (5) and an annular second distribution line (11b) fluidically connected to the hollow space (5) via the second coolant line (7b).

In some embodiments, the first (11a) and the second (11b) annular distribution lines are each situated concentrically about the rotational axis (2) at different radial distances.

In some embodiments, there is a plurality of first radial coolant lines (7a) between the hollow space (5) and the first distribution line (11a) and a plurality of second radial coolant lines (7b) between the hollow space (5) and the second distribution line (11b).

In some embodiments, the first and/or second radial coolant lines (7a, 7b) are each azimuthally uniformly distributed.

In some embodiments, there are an equal number of first (7a) and second (7b) radial coolant lines, wherein first (7a) and second (7b) radial coolant lines are situated in alternation about the rotational axis in the azimuthal direction.

In some embodiments, there are an equal number of first (7a) and second (7b) radial coolant lines, wherein first (7a) and second (7b) radial coolant lines are routed in pairs in parallel with respect to each other.

In some embodiments, the number of coils (12i) is at least twice as great as the number of first radial coolant lines (7a).

In some embodiments, a rotor (1) of an electric machine comprises a cooling device as described above. In some embodiments, an electric machine comprises a rotor (1) as described above.

BRIEF DESCRIPTION OF THE DRAWINGS

The teachings of the present disclosure are described in the following on the basis of a few exemplary embodiments, with reference to the attached drawings, in which.

DETAILED DESCRIPTION

Figure 1:
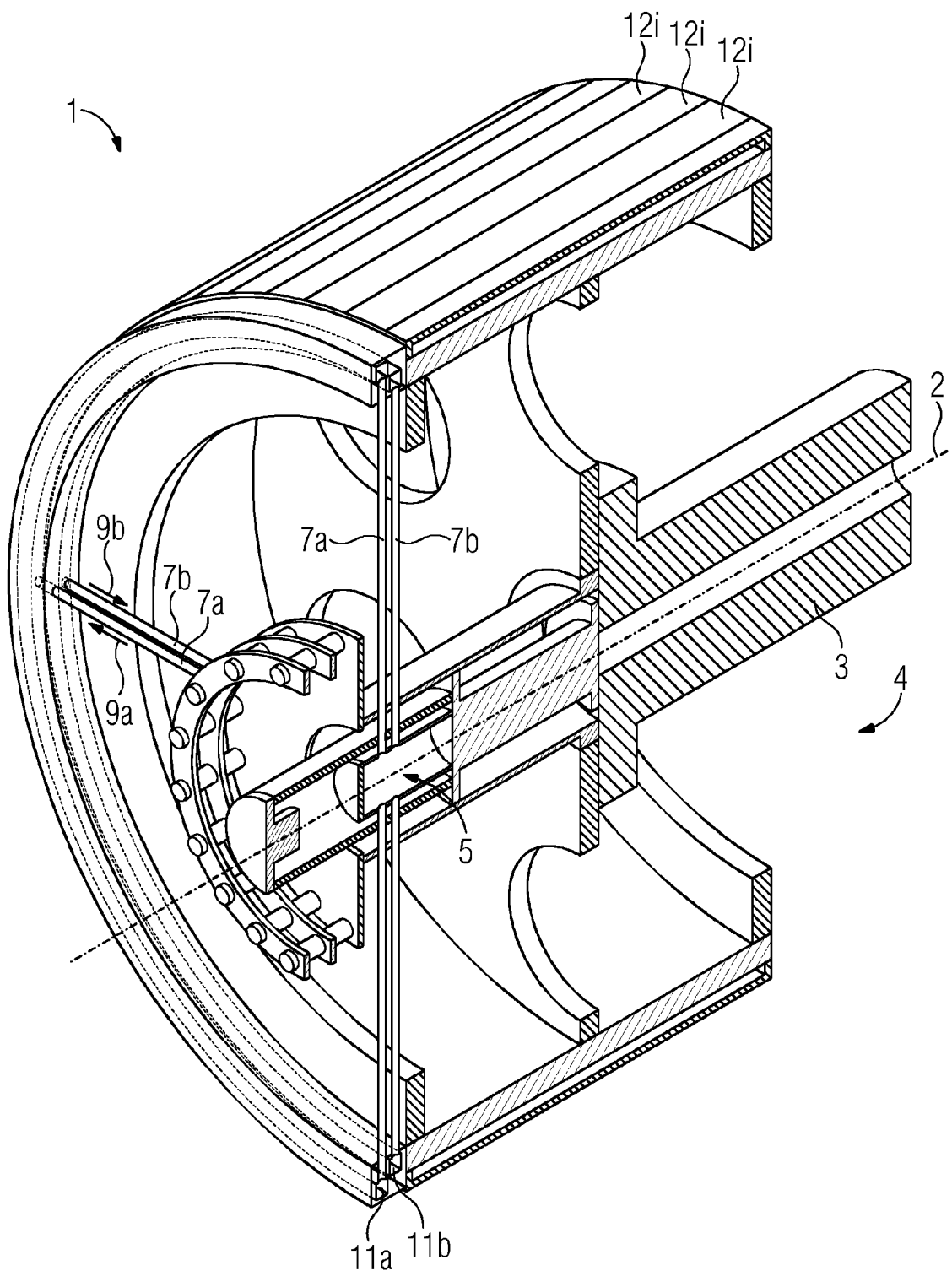
FIG. 1 shows a schematic perspective representation of a rotor comprising a cooling device according to a first exemplary embodiment.

The teachings of the present disclosure may be embodied in a cooling device for cooling a rotor of an electric machine. The rotor is supported by a central rotor shaft and has a hollow space in the interior of the rotor shaft for accommodating coolant. The cooling device may comprise at least one first coolant line, which extends radially outwardly from the hollow space, and an annular first distribution line which is connected to the hollow space via this first coolant line.

The cooling device described, by means of the annular distribution line, may efficiently cool rotors having a high number of electric coils, in an easy way. The line system made up of the hollow space in the rotor shaft, the radial coolant line, and the annular distribution line allows for the circulation of a liquid or gaseous coolant toward the regions of the rotor that are to be cooled. Due to the use of an annular distribution line for the coolant, the need for individual radial coolant feed lines for each coil winding is avoided. As compared to rotors of conventional, high pole-count machines comprising solid copper elements, the weight of the cooling device can be reduced by the use of liquid or gaseous coolant.

The coolant can be fed into the rotor shaft, for example, in an axially further remotely located region. The coolant can circulate in a closed circuit in this case, wherein coolant evaporated in the rotor can condense again on a cold head situated in a stationary manner outside the rotor. Since no co-rotating cold heads are therefore required, the design can be simplified as compared to known high pole-count rotors and the service life as well as the maintenance intervals of the cold heads can be increased.

The distribution of the coolant via an annular distribution line permits uniform cooling of electric coils situated on the rotor also in the case of a high number of coils. Complexity, weight, and material outlay can be substantially reduced as compared to an embodiment comprising separate radial coolant lines for each coil.

The annular first distribution line can be situated, as a closed loop line, concentrically about the rotational axis. In such embodiments, a transport of the coolant to all azimuthal positions of the rotor is made possible in an easy way. The "different azimuthal positions" is to be understood, in this case, to be the different angular positions in the direction of rotation of the rotor. For this purpose, the annular first distribution line can be designed, in particular, as a circular loop line.

The rotor can comprise a plurality of electric coils at different azimuthal positions. In this case, each of the coils can be thermally coupled to a coil cooling pipe which is fluidically connected to the first annular distribution line via an outlet in each case. In such embodiments, the coolant can be transported via the annular distribution line to the different azimuthal positions of the individual coils, wherein said coolant subsequently travels in the axial direction through the coil cooling pipes branching off from the distribution line, into the regions of the coil windings. The coil cooling pipes can therefore branch off from the distribution line at different azimuthal positions and transport the coolant, for example in the axial direction, into the regions to be cooled. The thermal coupling of the coolant contained in the coil cooling pipes with the electric coils can take place in different ways in this case. For example, the windings of the electric coils can be mechanically directly connected to the outer sides of the coil cooling pipes. Alternatively or additionally, the coil windings can be connected to the coil cooling pipes by means of thermally conductive copper pieces. One further possible alternative is to embed the coil cooling pipes into a winding support of the coil windings. In this case, the winding support can be formed from highly conductive material.

The pipe cross-section of the first distribution line may be larger than the pipe cross-section of the individual coil cooling pipes. As a result, a uniform distribution of the coolant in the annular distribution line can be achieved. A largely uniform flow through the coil cooling pipes branching off at different azimuthal positions can then be achieved, whereby a uniform cooling of the electric coils situated next to one another can be achieved. For example, the pipe cross-sectional area of the first distribution line can be at least twice as great, in particular at least four times as great as the pipe cross-sectional area of the individual coil cooling pipes. The ratios of the pipe cross-sectional areas described apply similarly when a second distribution line and one or more second radial coolant lines are present.

The pipe cross-section of the first distribution line can have a size similar to that of the pipe cross-section of the first radial coolant line. In some embodiments, these two pipe cross-sections do not differ by more than 50% of the larger of the two cross-sectional areas.

In some embodiments, each coil comprising a separate coil cooling pipe can be thermally connected to the first annular distribution line. As a result, a particularly uniform cooling of the different electric coils can be achieved, because coolant flows in parallel through the regions of the different coils to be cooled. The coolant in the regions of the different coils is therefore at a relatively uniform temperature level. As compared to a serial flow of coolant through the coils, a uniform temperature is achieved in this way in combination with the use of smaller quantities of coolant.

In some embodiments, the individual coils can be combined to form cooling groups, wherein the coils of each cooling group can be thermally coupled to one shared coil cooling pipe. In such embodiments, the total number of coolant pipes required can be further reduced. The number of branch-offs required at the loop line is also reduced, whereby the complexity of the cooling device is reduced. The electric coils of the rotor can be subdivided, for example, into a certain number of coolant groups having the same size. For example, two, four or even more electric coils can always be combined to form one coolant group in each case. In the case of a relative low number of, for example, two to four electric coils per coolant group, a relative uniform temperature distribution of the different coils can nevertheless be achieved in this way. In this embodiment, coolant therefore flows through two to four electric coils in series in each case, while coolant flows through the particular coolant groups in parallel with respect to each other. This results in a compromise between uniform temperature distribution and complexity of the cooling device.

In some embodiments, the cooling device comprises at least one second coolant line, which extends radially outwardly from the hollow space, and an annular second distribution line which is fluidically connected to the hollow space via this second coolant line. For example, the first annular distribution line can transport coolant to the electric coils and the second annular distribution line can transport the coolant back into the hollow space in the rotor shaft. The first radial coolant line is then used for feeding the coolant into the first distribution line and the second radial coolant line is used for transporting the coolant from the second distribution line back into the hollow space in the rotor shaft. In this embodiment comprising two separate annular distribution lines for the two directions of flow, it is therefore possible to achieve a closed coolant circuit beyond the regions of the coils to be cooled.

The first and the second annular distribution lines can each be situated concentrically about the rotational axis at different radial distances. As a result, a geometric separation of the two annular distribution lines can be achieved, whereby the guidance of the coil cooling pipes of the individual coils branching off from the loop lines can be simplified. In some embodiments, the first annular distribution line feeds the coolant into the regions to be cooled and is situated at a radially further outward position than the second annular distribution line provided for the return transport of the coolant. In this way, the centrifugal forces formed during the rotation can be utilized to promote a distribution of the coolant in the direction of the cooling circuit. In some embodiments, the two annular distribution lines can be axially offset with respect to each other.

In some embodiments, the cooling device comprises a plurality of first radial coolant lines between the hollow space and the first distribution line and, in addition, a plurality of second radial coolant lines between the hollow space and the second distribution line. In this way, multiple radial coolant paths are provided, in order to transport the coolant in both directions of flow. Therefore, a uniform distribution of the coolant via the two annular distribution lines is facilitated without the need for an excessively large number of radial lines.

In some embodiments, these first and/or second radial coolant lines can each be azimuthally uniformly situated. By means of this embodiment, a particularly uniform distribution of the coolant via the first and/or the second distribution line is achieved. In addition, such an arrangement contributes to a uniform balancing of the entire rotor.

In some embodiments, the number of first radial coolant lines can be equal to the number of second radial coolant lines. In this case, first and second radial coolant lines can be situated, in the azimuthal direction, in alternation about the rotational axis. A particularly uniform temperature distribution over the different electric coils can be achieved, since the paths of the coolant covered at the different azimuthal positions, in totality, can be adjusted in this case. In other words, a separate parallel coolant path is formed for each of the electric coils, the total length of which across the radial coolant lines, the two annular distribution lines, and the coil cooling pipes, in totality, is approximately equal. The electric coils that have a shorter connection via the first annular distribution line simultaneously have a longer connection via the second annular distribution line, and vice versa.

In some embodiments, a first and a second radial coolant line can be guided in pairs in parallel with respect to each other in each case. For example, the two lines of such a pair can be routed next to each other with a slight axial offset. In this case, said lines can be thermally insulated together with respect to the external surroundings, for example, by means of vacuum insulation jointly surrounding both lines and/or by means of layers of superinsulation. Alternatively, the first and the second radial coolant lines of such a pair can also be concentrically routed into each other. For example, the second radial coolant line for returning coolant into the hollow space can concentrically surround the first radial coolant line for feeding coolant into the rotor. By means of such a counterflow arrangement, the thermal insulation of the coolant, which is still cold, in the first radial coolant line with respect to the external surroundings can be improved.

In the case of a cooling device for a rotor comprising a plurality of electric coils, the number of coils can be at least twice as great as the number of first radial coolant lines. As compared to a separate coupling of the individual electric coils, the number of radial coolant lines is therefore reduced. The ratio of the number of coils to the number of first radial coolant lines can be even substantially greater; in particular, this ratio can be at least 4:1, particularly advantageously even at least 10:1. Given the aforementioned numerical ratios, the at least one annular distribution line results in a particularly far-reaching reduction of the complexity of the cooling system.

In some embodiments, the above-described cooling devices are utilized with rotors having high numbers of electric poles. For example, the number of electric coils can be, in general, at least 20, or at least 40. The number of first and/or second radial coolant lines can be between 2 and 10, or between 3 and 6. The coolant of the cooling device can include, for example, nitrogen, helium, and/or neon. By means of the aforementioned substances, a relatively large range of cryogenic operating temperatures can be made accessible with different pressure ranges.

The different pipes of the cooling device (the radial coolant lines, the annular connection lines, and/or the coil cooling pipes) can be thermally insulated either separately or jointly with respect to the external surroundings. This can be achieved, for example, by means of a surrounding vacuum insulation and/or by means of one or more layers of superinsulation.

The electric coils of the rotor can be, in general, coils comprising superconducting coil windings, in particular comprising high-temperature superconducting coil windings.

The electric machine can be, for example, a generator or a motor.

FIG. 1 shows a schematic perspective representation of a rotor 1 of an electric machine comprising a cooling device according to a first exemplary embodiment. The rotor 1 is supported by a rotor shaft 3 and rotates together therewith about a central rotational axis 2. The rotor body 4 is therefore situated radially outwardly around the rotor shaft 3. The rotor body 4 comprises a plurality of electric coils 12$i$ which, in this example, are designed as superconducting coil windings. These are windings comprising high-temperature superconducting material. These superconducting windings are cooled by means of the cooling device to an operating temperature below their transition temperature. Heat must be constantly carried away from the region of the coils 12*i* to maintain this operating temperature. In the example shown, this is the rotor of an electric machine having a high number of poles. Such a high pole-count rotor can be utilized, for example, in a generator for generating current from wind power or hydropower. In the example shown, the rotor comprises a total of 56 electric coils which are arranged next to each other in the azimuthal direction. Said coils are situated inside the rotor body 4 at a relatively high radial distance from the rotor shaft 3.

The cooling device of the rotor 1 cools the electric coils 12*i* with the aid of a liquified or gaseous coolant 6. Said coolant may be liquified neon in the example shown. The neon is condensed on a cold head, which is fixedly situated axially further away and outside the rotor shaft, and is subsequently fed into an inner space of the rotor shaft 3. In the region shown, the cooling device is expanded in the inner chamber of the rotor shaft 3 to form a hollow space 5 in which a reservoir of the coolant 6 is therefore present. Overall, the coolant 6 is circulated between this reservoir 5 and the fixed cold head (not shown) in a closed circuit, for example, in the manner of the thermosiphon principle. The feeding of the coolant 6 into the rotor shaft 3 can take place in different ways, for example, via a freely accessible first shaft end 3*a*. In some embodiments, however, in an axially inner region of the rotor shaft 3, the coolant can also be fed radially into an interior of the rotor shaft 3.

Proceeding from the reservoir of liquified coolant 6 in the inner hollow space 5, the coolant is transported radially outwardly via multiple first radial coolant lines 7*a*. By way of these first radial coolant lines 7*a*, said coolant reaches a first distribution line 11*a*. This first distribution line 11*a* is designed as an annularly closed pipeline. By way of this distribution line, the liquified coolant 6 can therefore reach all azimuthal positions in a radially outward region of the rotor 3. At these different azimuthal positions, the distribution line 11*a* is provided with a plurality of outlets 15*i* which are not depicted in FIG. 1, for the sake of clarity. Via these outlets 15*i*, the liquified coolant enters the region of the electric coils 12*i* to be cooled, from where said coolant can return to a second distribution line 11*b* via inlets 17*i* (also not shown).

This second distribution line 11*b*, similar to the first distribution line 11*a*, may likewise be an annularly closed pipeline. Said pipeline is used for collecting the coolant 6 which has been heated in the region of the electric coils 12*i* and which is possibly partially evaporated here. From this second distribution line 11*b*, the coolant which has been heated in this way returns via a plurality of second radial coolant lines 7*b* into the hollow space 5 inside the rotor shaft 3. Therefore, a closed circuit between the inner hollow space 5 and the region of the rotor to be cooled is formed via the system made up of two annular distribution lines and multiple radial coolant lines.

Four first radial coolant lines 7*a* and four second radial coolant lines 7*b* are shown in the example depicted in FIG. 1. These are bundled together in pairs, wherein one first radial coolant line and one second radial coolant line form one pair. The resultant four pipe pairs are uniformly situated about the rotational axis 2 in a spoke-like configuration, and therefore a quartic symmetry results overall for this pipeline 7*a* and 7*b*. The number of radial coolant lines 7*a* and 7*b* is substantially less in this case than the number of electric coils. As compared to a coupling of each of the coils 12*i* to a separate pipeline, the complexity of the system and the number of required lines are therefore substantially reduced. Due to the annular distribution lines 11*a* and 11*b*, a relatively uniform flow of coolant 6 through the coils 12*i* is nevertheless achieved. The superconducting coils can therefore be cooled to an operating temperature that is relatively similar for all.

Figure 2:
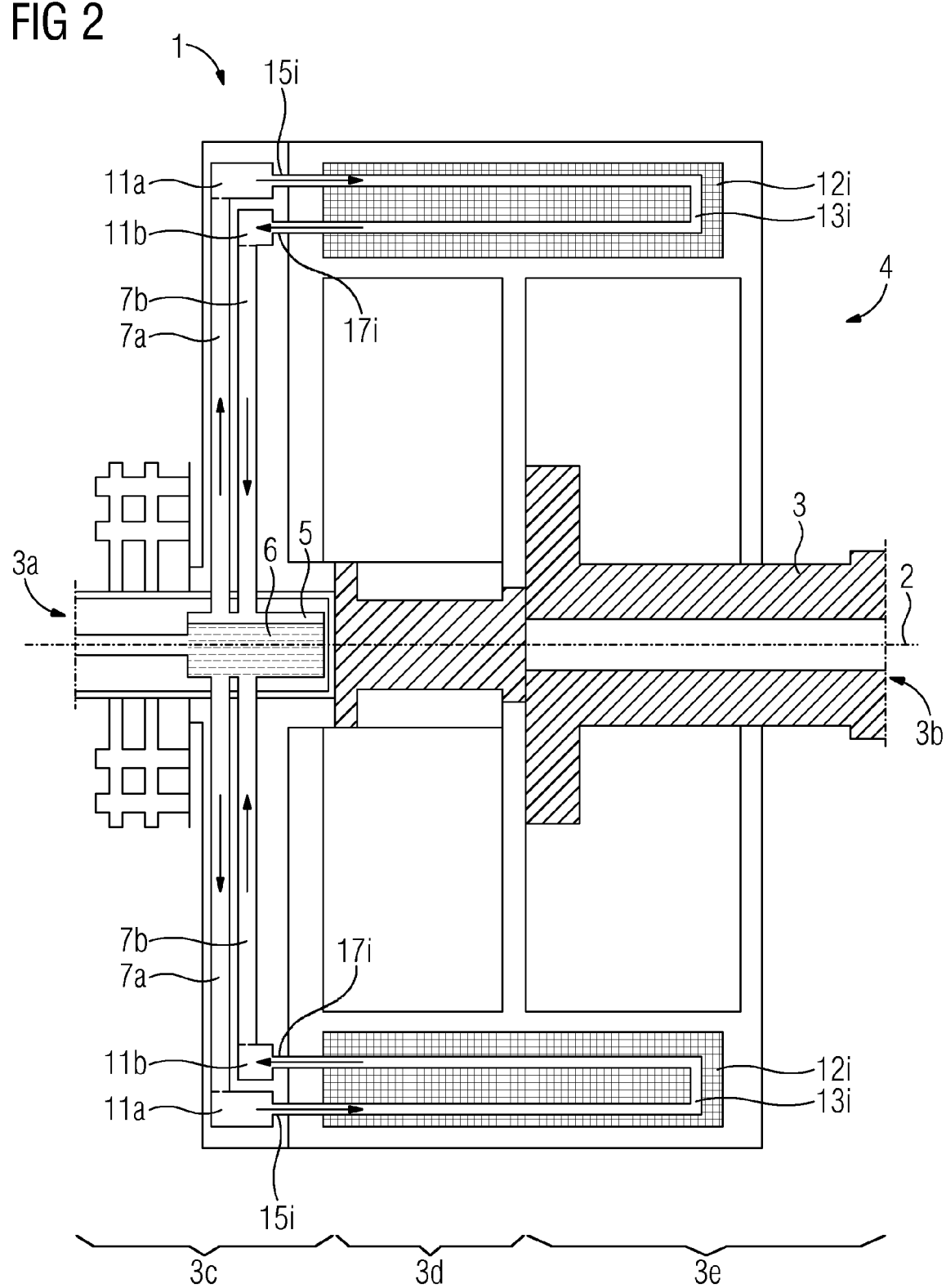
FIG. 2 shows a schematic longitudinal sectional view of a rotor according to a second exemplary embodiment.

FIG. 2 shows a schematic longitudinal sectional view of a similar rotor 1 which, for example, can be designed similarly to the rotor shown in FIG. 1. The sectional view shows the region of two pairs, which are positioned opposite each other, of a first radial coolant line 7*a* and a second radial coolant line 7*b* in each case. These two coolant lines are connected to the annular first and second distribution lines 11*a* and 11*b*, respectively. In the sectional view in FIG. 2, it is evident that an outlet 15*i* branches off from the first annular distribution line 11*a*, via which outlet the first distribution line 11*a* is fluidically connected to a coil cooling pipe 13*i*. This coil cooling pipe 13*i* thermally contacts the region of the electric coil 12*i* and thereby cools the coil winding, to cool the superconducting conductor material to its operating temperature. The coil cooling pipe 13*i* passes through the region of the coil 12*i* in the form of a loop and is connected, at its end, to an inlet 17*i* of the second distribution line 11*b*. In this way, the coolant 6, which has been heated, returns into the circuit. The rotor of the second exemplary embodiment comprises such outlets 15*i*, coil cooling pipes 13*i*, and inlets 17*i* not only in the cutting plane shown, but also in all azimuthal positions at which electric coils 12*i* are situated. In this case, therefore, assigned to each electric coil 12*i* is a separate outlet 15*i*, a separate coil cooling pipe 13*i*, and a separate inlet 17*i*. For example, in turn, between 20 and 100 such electric coils, e.g. 40 such coils can be cooled in parallel in this way. Only a few radial coolant lines are necessary for this purpose. The number of first radial coolant lines 7*a* and of second radial coolant lines 7*b* can be between two and eight in this case.

As shown in the examples according to FIG. 1 and FIG. 2, the hollow space 5 in the interior of the rotor shaft 2 does not need to extend along the entire axial length of the rotor shaft 2. A hollow shaft section 3*c*, in which the hollow space 5 is situated, is initially located here, adjoining the first shaft end 3*a*, at which the coolant 6 is fed. A solid shaft section 3*d* is situated adjacent thereto, whereby a greater mechanical stability of the rotor shaft is achieved than is the case with a continuously hollow shaft. In the example shown, adjoining the region 3*d* is one further hollow shaft section 3*e* which, however, is not provided for the circulation of coolant, but rather can be utilized for other necessary functionalities of the rotor, for example, for installing hydraulic lines.

Figure 3:
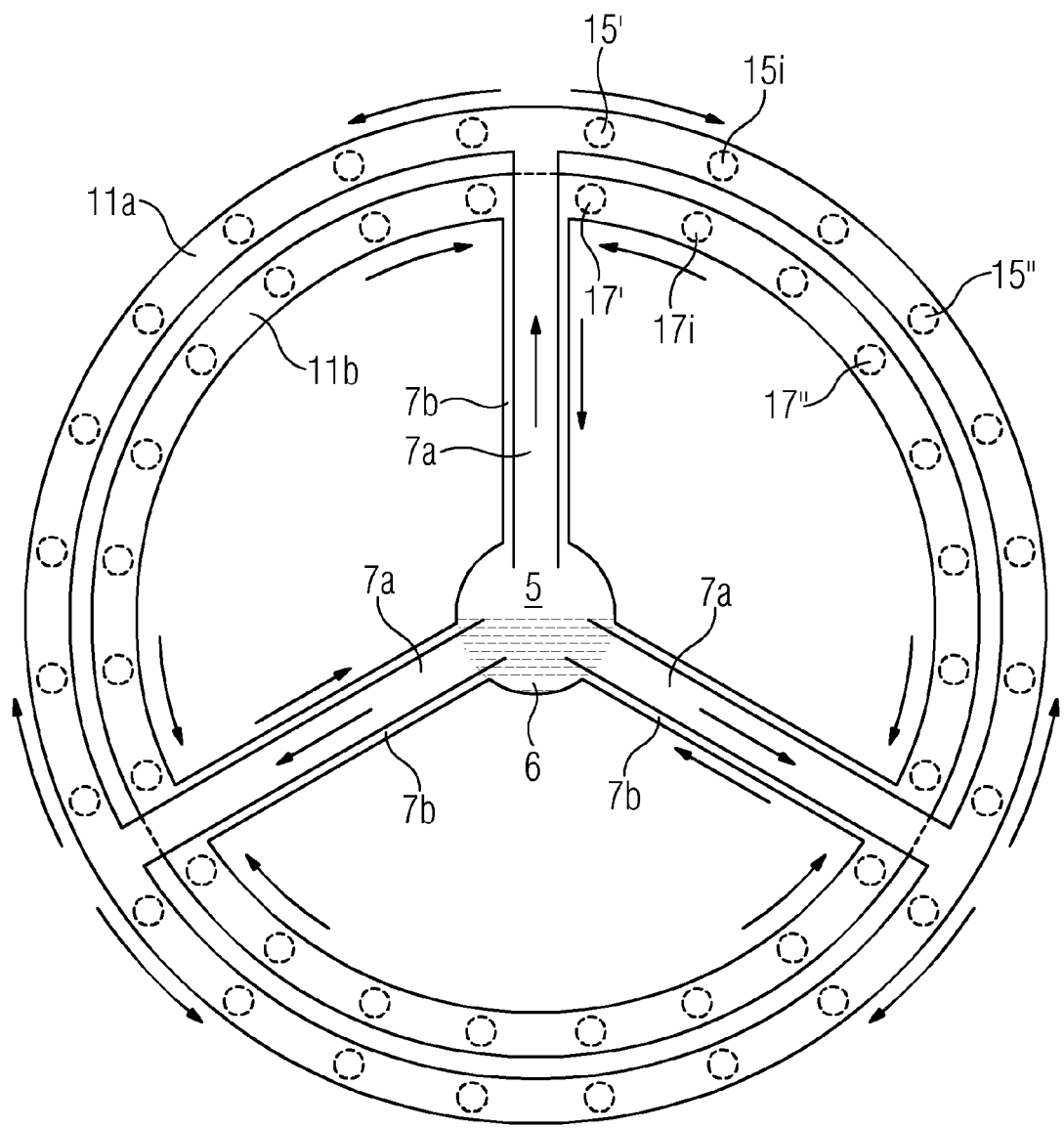
FIG. 3 shows a schematic cross-section in the region of two connection lines of a rotor according to a third exemplary embodiment.

FIG. 3 shows a schematic cross-section of a rotor 1 in the region of the annular distribution lines 11*a* and 11*b* according to a third exemplary embodiment of the invention. In this case, only the topology of the different pipelines is depicted; the remaining components of the rotor are omitted for the sake of clarity. The first distribution line 11*a* is fluidically connected to the hollow space 5 in the rotor shaft via three first radial coolant lines 7*a*. Likewise, the second annular distribution line 11*b* is connected to the hollow space 5 via three second radial coolant lines 7*b*.

In this case, a first radial coolant line 7*a* is routed together with a second radial coolant line 7*b* in each case, wherein the second radial coolant lines 7*b* concentrically surround the first radial coolant lines 7*a* in each case. The flow directions of the coolant are indicated using arrows in FIG. 3. In this case, the first coolant lines 7*a* are each designed as feed lines and the second coolant lines 7*b* are each designed as return lines. The cold coolant 6, which is still liquified, is therefore transported in the interior of the lines 7*a* and is surrounded, in the manner of the counterflow principle, by the coolant flowing back into the second radial coolant lines 7b. As a result, a thermal insulation with respect to the even warmer external surroundings is already achieved. In addition, all pipelines, i.e., the radial coolant lines 7a and 7b, the distribution lines 11a and 11b, and the coil cooling pipes 13i branching off therefrom, are surrounded with further insulations. It is apparent from FIG. 3 that the two annular distribution lines 11a and 11b are situated at different radii. In this case, the first distribution line 11a used as a coolant feed line is situated further outward than the distribution line 11b utilized for the return.

Each of the two distribution lines 11a and 11b is connected via 24 branch-offs to the particular coil cooling pipes which lead to the individual electric coils. These branch-offs are designed as outlets 15i of the first distribution line 11a and as outlets 17i of the second distribution line 11b. In the example depicted in FIG. 3, each of the 24 adjacent coil cooling pipes is used for cooling a group of two electric coils in each case, the coolant from a coil cooling pipe flowing sequentially through the coils.

The arrangement of the first and the second radial coolant lines 7a and 7b shown in pairs in FIG. 3 may reduce the number of required spoke-like radial connections by the greatest extent possible. A favorable mechanical distribution of force in combination with a low number of pipes results already in the three connections in each case, which are arranged in a spoke-type manner. The ratio of the number of inlets and outlets 15i and 17i, respectively, to the number of radial coolant lines 7a and 7b is therefore 8:1 in this case. Different flow conditions result in this case for the different inlets and outlets 15i and 17i, respectively. By way of example, a first outlet 15' and a first inlet 17' are indicated in FIG. 3, both of which are located relatively close to the radial coolant lines 7a and 7b. A relatively short total flow path for the coolant therefore results for the electric coils at the corresponding azimuthal positions. In contrast thereto, a second outlet 15" and a second inlet 17" are indicated in FIG. 3, the azimuthal position of which is located substantially further away from the radial coolant lines 7a and 7b. Therefore, there is a substantially longer flow path for the coolant 6 for the coils assigned to the branch-offs 15" and 17".

Different measures can be implemented to accommodate the flow conditions for the cooling of the different coils and nevertheless achieve a temperature distribution of the operating temperatures that is as uniform as possible. In some embodiments, for example, the pipe cross-section of the first and the second distribution lines 11a and 11b is greater than the pipe cross-section of the coil cooling pipe 13i adjacent thereto, in each case. In general, the ratio of these pipe cross-sections can be at least 2:1. In addition, the pipe cross-section of the distribution lines 11a and 11b can also vary around the circumference of the pipelines. In this way, the cross-section, for example, in the region of the remote branch-offs 15" and 17", can be designed to be greater than it is close to the radial coolant lines 7a and 7b. The cross-section of the branch-offs can also vary to thereby adjust the flow resistance.

Figure 4:
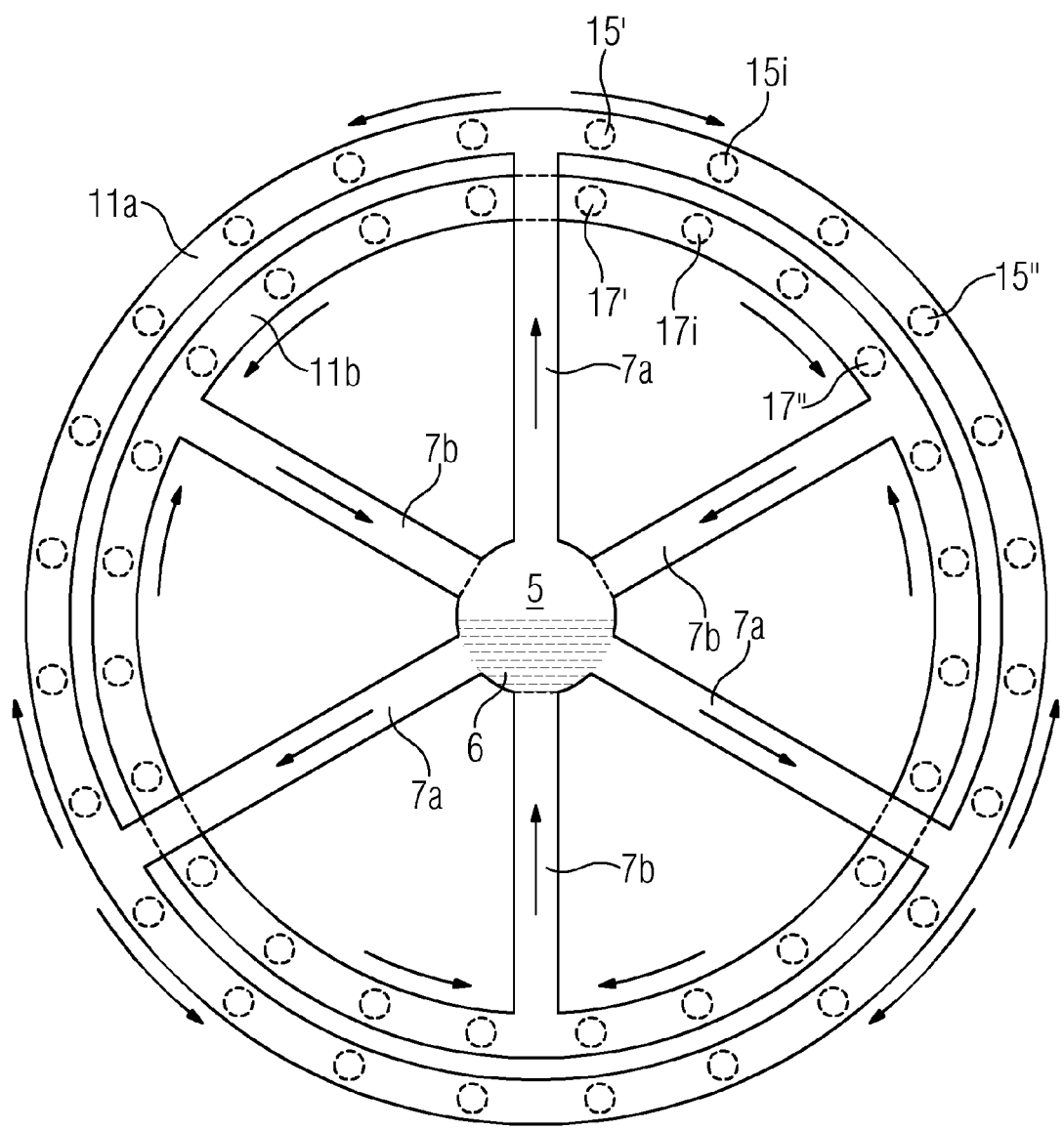
FIG. 4 shows a schematic cross-section in the region of two connection lines of a rotor according to a fourth exemplary embodiment.

FIG. 4 shows a similar schematic cross-sectional representation of two distribution lines 11a and 11b according to a fourth exemplary embodiment. In this exemplary embodiment, in turn, both distribution lines 11a and 11b are connected to the hollow space 5 via three first or second radial coolant lines 7a or 7b in each case. In this case as well, the first radial coolant lines 7a are each designed as coolant feed lines and the second radial coolant lines are designed as coolant return lines, which is indicated by the arrows in the figure. These feed lines and return lines are not routed here in pairs, however, but rather are distributed in alternation at different angular positions.

As a result, more spoke-like connections are required overall; in this variant embodiment, the flow conditions are more similar at the different azimuthal positions of the different coils, however. By way of example, a first outlet, which is located close to a feed line 7a, is labeled with 15' on the first distribution line 11a. The coil cooling pipe branching off from there leads into the second distribution line 11b via the inlet 17' at the corresponding angular position. This first inlet 17' is relatively far away from the next second radial coolant line 7b, however, and therefore, overall, coolant must flow through an entire angular segment of 60° via both distribution lines 11a and 11b in combination. By comparison, a second outlet 15" and a second inlet 17" are indicated in FIG. 4, both of which are located close to a second radial coolant line 7b. At this angular position, the connection to the coolant feed line 7a is therefore longer, but the connection to the coolant return line 7b is correspondingly shorter. Overall, substantially adjusted flow paths result for the different azimuthal positions of the branch-offs 15i and 17i, which facilitates the formation of a uniform temperature distribution over the different coils 12i.

What is claimed is:

1. A cooling device for cooling a rotor mounted to rotate about a rotational axis, wherein the rotor is supported by a central rotor shaft and comprises a hollow cavity in the interior of the rotor shaft for accommodating coolant, the cooling device comprising:
   a first coolant line extending radially outwardly from the hollow cavity;
   an annular first distribution line fluidically connected to the hollow cavity via the first coolant line; and
   a first coolant return line connecting the annular first distribution line back to the hollow cavity to form a loop so a coolant may flow through a circular loop line from the hollow cavity through the first coolant line, the annular first distribution line, the first coolant return line, back into the hollow cavity, and then directly back into the first coolant line.

2. The cooling device as claimed in claim 1, wherein:
   the rotor comprises a plurality of electric coils at different azimuthal positions; and
   each coil is thermally coupled to a coil cooling pipe fluidically connected to the first annular distribution line via an outlet.

3. The cooling device as claimed in claim 2, wherein a cross-section of the first distribution line is greater than a cross-section of the individual coil cooling pipes.

4. The cooling device as claimed in claim 2, wherein each coil is connected via a separate coil cooling pipe to the first annular distribution line.

5. The cooling device as claimed in claim 2, wherein the individual coils are combined to form cooling groups; and
   the coils of each cooling group are thermally coupled to one shared coil cooling pipe.

6. The cooling device as claimed in claim 1, further comprising:
   a second coolant line extending radially outwardly from the hollow space;
   an annular second distribution line fluidically connected to the hollow space via the second coolant line; and
   a second coolant return line connecting the annular first distribution line back to the hollow space;

wherein the first coolant line and the second coolant line are in fluid communication only via the hollow space.

7. The cooling device as claimed in claim 6, wherein the first and the second annular distribution lines are each situated concentrically about the rotational axis at different radial distances.

8. The cooling device as claimed in claim 6, further comprising a plurality of first radial coolant lines between the hollow space and the first distribution line; and
   a plurality of second radial coolant lines between the hollow space and the second distribution line.

9. The cooling device as claimed in claim 8, wherein the plurality of first coolant lines or the plurality of second radial coolant lines are azimuthally uniformly distributed with respect to one another.

10. The cooling device as claimed in claim 8, further comprising an equal number of first radial coolant lines and second radial coolant lines, wherein the first and second radial coolant lines alternate in distribution around the rotational axis in the azimuthal direction.

11. The cooling device as claimed in claim 8, further comprising an equal number of first radial coolant lines and second radial coolant lines, wherein the first and second radial coolant lines are routed in pairs in parallel with respect to each other.

12. The cooling device as claimed in claim 2, wherein the number of coils is at least twice as great as the number of first radial coolant lines.

\* \* \* \* \*